(12) United States Patent
Liao et al.

(10) Patent No.: US 9,001,437 B2
(45) Date of Patent: Apr. 7, 2015

(54) IMAGING LENS ASSEMBLY

(71) Applicant: Ability Opto-Electronics Technology Co., Ltd., Taichung (TW)

(72) Inventors: Kuo-Yu Liao, Taichung (TW); Chen-Hung Tsai, Taichung (TW); Po-Jui Liao, Taichung (TW); Chao-Hsiang Yang, Taichung (TW)

(73) Assignee: Ability Opto-Electronics Technology Co., Ltd., Taichung (TW)

( * ) Notice: Subject to any disclaimer, the term of this patent is extended or adjusted under 35 U.S.C. 154(b) by 0 days.

(21) Appl. No.: 14/141,836

(22) Filed: Dec. 27, 2013

(65) Prior Publication Data
US 2014/0334018 A1    Nov. 13, 2014

(30) Foreign Application Priority Data
May 10, 2013    (TW) .............................. 102208649 U (51) Int. Cl.
*G02B 13/02* (2006.01)
*G02B 13/00* (2006.01)

(52) U.S. Cl.
CPC ........ *G02B 13/0035* (2013.01); *G02B 13/0055* (2013.01)

(58) Field of Classification Search
USPC ......................................................... 359/716
See application file for complete search history.

(56) References Cited

U.S. PATENT DOCUMENTS

2014/0184877 A1 *   7/2014   Ahn et al. ..................... 348/340

* cited by examiner

*Primary Examiner* — James Jones
(74) *Attorney, Agent, or Firm* — LeClairRyan (57) ABSTRACT

An imaging lens assembly includes first, second and third optical lenses that are arranged sequentially from an object side to an image side along an optical axis, and a constant-aperture diaphragm disposed between the second optical lens and the object side. Each of the first and second optical lenses has a positive refractive power near the optical axis. The third optical lens has a negative refractive power near the optical axis and has an object-side surface and an image-side surface, at least one of which has at least an inflection point. The imaging lens assembly satisfies: $0.55<f/Dg<0.85$, in which, f is a focal length of the imaging lens assembly, and Dg is a length of a diagonal line of a maximum viewing angle in an imaging plane.

6 Claims, 12 Drawing Sheets

IMAGING LENS ASSEMBLY

CROSS-REFERENCE TO RELATED APPLICATION

This application claims priority of Taiwanese Application No. 102208649, filed on May 10, 2013.

BACKGROUND OF THE INVENTION

1. Field of the Invention

The present invention relates to an imaging lens assembly.

2. Description of the Related Art

An imaging lens set is generally adopted in a mobile phone, a smart phone, a tablet computer, a notebook computer or an imaging lens assembly. With the rapid development of technology, these electronic devices are designed to be increasingly thinner. Therefore, the imaging lens set for these electronic devices should be made correspondingly smaller as well.

A conventional imaging lens set as disclosed in Taiwanese Patent No. 1288857 includes three lenses.

SUMMARY OF THE INVENTION

An object of the present invention is to provide an imaging lens assembly that has an alternative three-lens structure.

Accordingly, an imaging lens assembly includes an optical lens set and a constant-aperture diaphragm.

The optical lens set includes first, second and third optical lenses that are arranged sequentially from an object side to an image side along an optical axis of the imaging lens assembly.

The first optical lens has a positive refractive power near the optical axis, the second optical lens has a positive refractive power near the optical axis, and the third optical lens has a negative refractive power near the optical axis. The third optical lens has an aspherical object-side surface that faces the object side, an asperhical image-side surface that faces the image side, and a peripheral surface interconnecting the object-side surface and the image-side surface. At least one of the object-side surface and the image-side surface of the third optical lens has at least one inflection point between the optical axis and the peripheral surface.

The constant-aperture diaphragm is disposed between the second optical lens and the object side.

The imaging lens assembly satisfies the following optical condition:

$$0.55 < f/Dg < 0.85,$$

in which, f represents a focal length of the imaging lens assembly, and Dg represents a length of a diagonal line of a maximum viewing angle in an imaging plane.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Before the present invention is described in greater detail, it should be noted that like elements are denoted by the same reference numerals throughout the disclosure.

Figure 1:
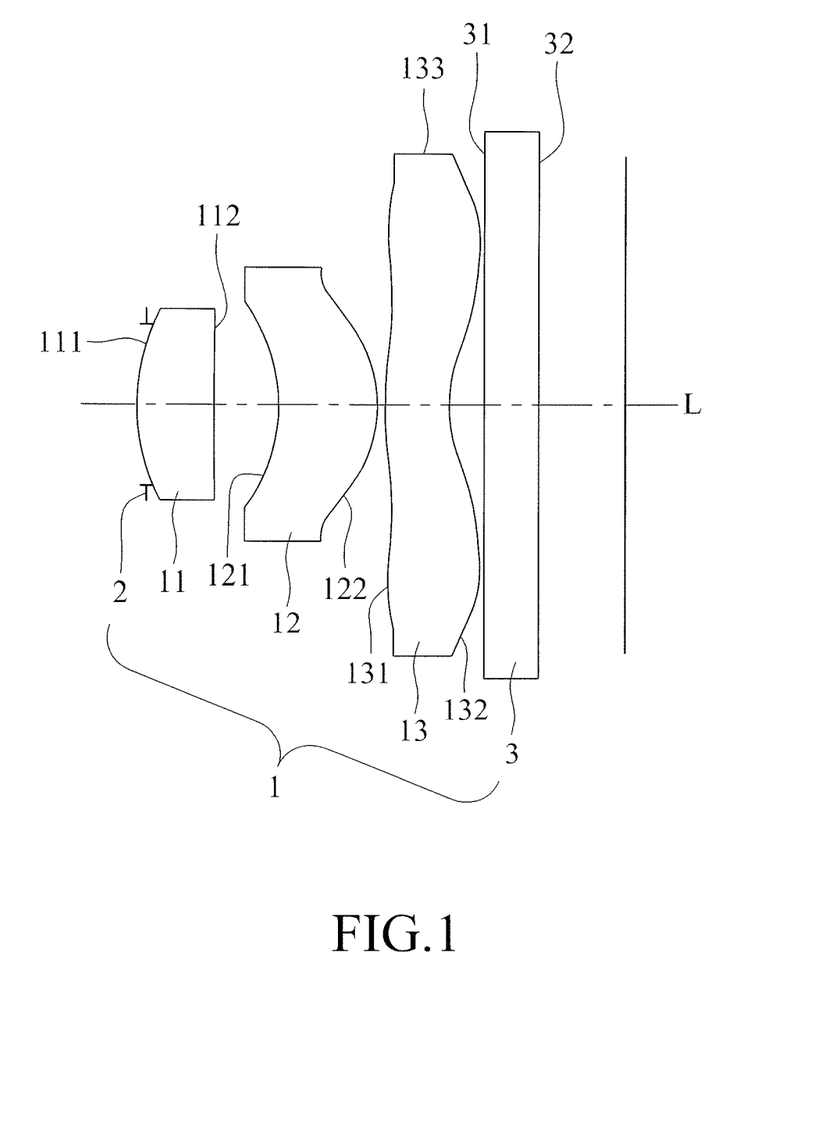
FIG. 1 is a schematic view of a first preferred embodiment of an imaging lens assembly according to the present invention.

Referring to FIG. 1, an imaging lens assembly according to the present invention includes an optical lens set 1, a constant-aperture diaphragm 2 and a filter 3.

The optical lens set 1 includes a first optical lens 11, a second optical lens 12 and a third optical lens 13. The first, second and third optical lenses 11, 12, 13 are arranged sequentially from an object side to an image side along an optical axis (L) of the imaging lens assembly.

The first optical lens 11 has a positive refractive power near the optical axis (L). The first optical lens 11 has an object-side surface 111 that faces the object side and that is a convex surface, and an image-side surface 112 that faces the image side and that is a concave surface.

The second optical lens 12 has a positive refractive power near the optical axis (L). The second optical lens 12 has an object-side surface 121 that faces the object side and that is a concave surface, and an image-side surface 122 that faces the image side and that is a convex surface.

The third optical lens 13 has a negative refractive power near the optical axis (L). The third optical lens 13 has an aspherical object-side surface 131 that faces the object side, an asperhical image-side surface 132 that faces the image side, and a peripheral surface 133 interconnecting the object-side surface 131 and the image-side surface 132. At least one of the object-side surface 131 and the image-side surface 132 of the third optical lens 13 has at least one inflection point between the optical axis (L) and the peripheral surface 133.

The constant-aperture diaphragm 2 is disposed between the object side and the second optical lens 12. In other words, the constant-aperture diaphragm 2 may be disposed between the object side and the first optical lens 11, or between the first optical lens 11 and the second optical lens 12.

The imaging lens assembly satisfies the following optical conditions:

$$0.55 < f/Dg < 0.85 \qquad (eq1),$$

$$|V1 - V2| < 10 \qquad (eq2),$$

in which, f represents a focal length of the imaging lens assembly, Dg represents a length of a diagonal line of a maximum viewing angle in an imaging plane, V1 represents an Abbe number of the first optical lens 11, and V2 represents an Abbe number of the second optical lens 12.

The value of f/Dg of the imaging lens assembly according to the present invention is controlled to be less than 0.85. According to Equation 1 (eq1), the value of f/Dg is directly proportional to f when Dg is fixed, and is inversely proportional to Dg when f is fixed. In other words, a smaller value of f/Dg means a shorter focal length of the imaging lens assembly under the circumstance that the length of the diagonal line of the maximum viewing angle in the imaging plane is constant, and a longer length of the diagonal line of the maximum viewing angle in the imaging plane under the circumstance that the focal length of the imaging lens assembly is constant. That is to say, the upper limit of 0.85 imposed on the value of f/Dg leads to an imaging lens assembly with a smaller size.

In addition, the conventional imaging lens set does not satisfy the optical condition of |V1−V2|<10 (i.e., eq2). On the contrary, the imaging lens assembly of the present invention satisfies Equation 2 (eq2), which means that a material of the first optical lens 11 is similar to that of the second optical lens 12. If the material of the first optical lens 11 is similar to or even identical with that of the second optical lens 12, the cost of purchase may be reduced.

Preferably, one of the object-side surface 111, 121 and the image-side surface 112, 122 of at least one of the first and second optical lenses 11, 12 is aspheric.

An aspheric surface satisfies the following equation:

$$z = \frac{ch^2}{1+[1-(k+1)c^2h^2]^{0.5}} + Ah^4 + Bh^6 + Ch^8 + Dh^{10} + Eh^{12} + Fh^{14} + Gh^{16} + Hh^{18} + Jh^{20} + \ldots, \quad (eq\ 3)$$

in which, z is the z-component of the displacement of the aspheric surface from the vertex of the aspheric surface along the optical axis (L), at a distance h from the optical axis (L); k is a conic constant; c is the reciprocal of a radius of curvature; and A, B, C, D, E, F, G, H and J are aspheric coefficients.

The filter 3 is a band-pass optical lens and is disposed between the third optical lens 13 and the image side.

It is to be understood that an image sensor on the imaging plane of the present invention is selected from a Charge-Coupled Device (CCD) and a Complementary Metal-Oxide-Semiconductor (CMOS).

First Preferred Embodiment

Figure 2:
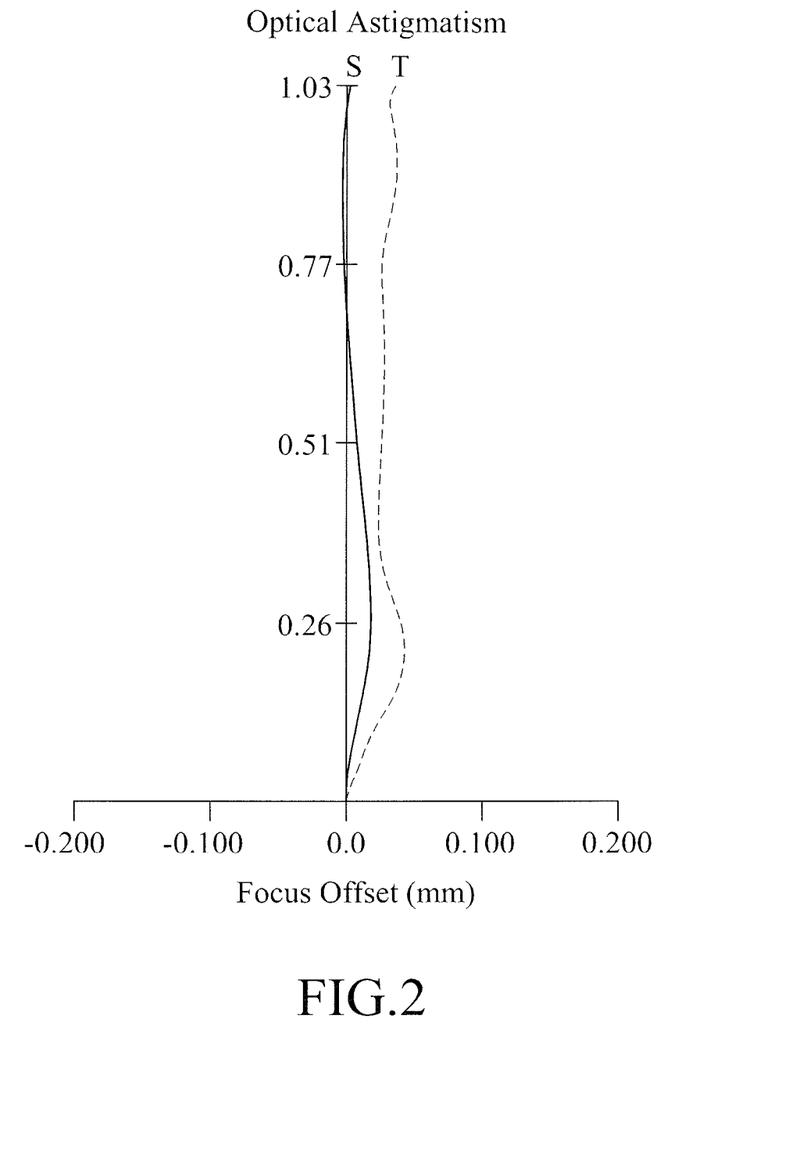
FIG. 2 is a simulation result of optical astigmatism of the first preferred embodiment.
Figure 3:
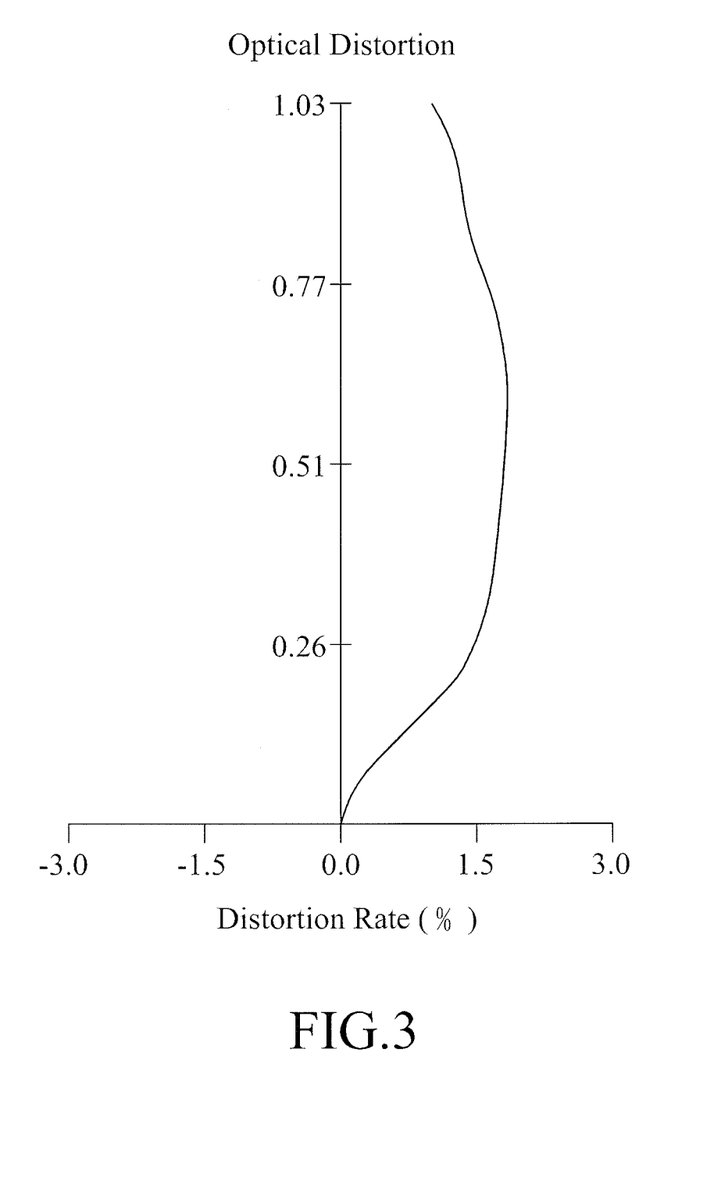
FIG. 3 is a simulation result of optical distortion of the first preferred embodiment.
Figure 4:
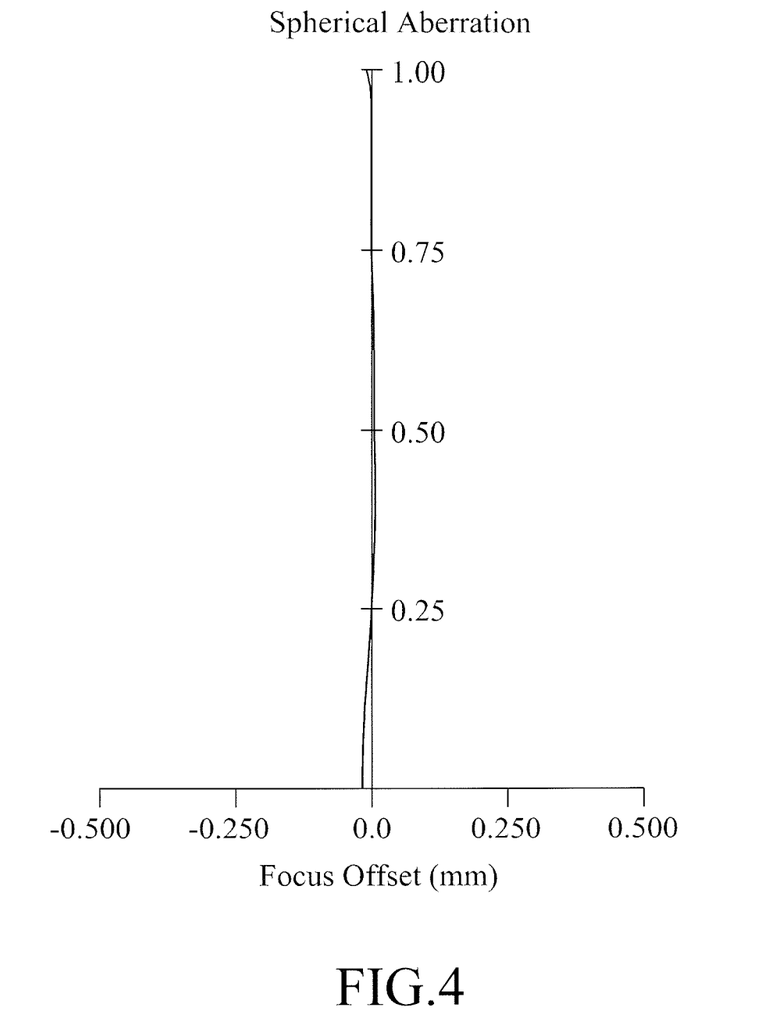
FIG. 4 is a simulation result of spherical aberration of the first preferred embodiment.

FIG. 1 a schematic view of a first preferred embodiment of the imaging lens assembly according to the present invention. FIG. 2 shows simulation result of optical astigmatism of the first preferred embodiment. FIG. 3 shows simulation result of optical distortion of the first preferred embodiment. FIG. 4 shows simulation result of spherical aberration of the first preferred embodiment.

In the first preferred embodiment, the constant-aperture diaphragm 2 is disposed between the object side and the first optical lens 11. Each of the object-side surface 111, 121, 131 and the image-side surface 112, 122, 132 of the first, second and third optical lenses 11, 12, 13 is aspheric. In addition, V1=56.07, V2=56.07, f=1.30 mm, and Dg=2.056 mm. As a result, |V1−V2|=0 and f/Dg=0.63.

Table 1 shows, as below, optical parameters of the optical lenses 11, 12, 13, the constant-aperture diaphragm 2 and the filter 3 having an object-side surface 31 that faces the object side and an image-side surface 32 that faces the image side of the first preferred embodiment according to the present invention.

TABLE 1

| | | Radius Of Curvature | Thickness | Refractive Index (Nd) | Abbe Number (Vd) |
|---|---|---|---|---|---|
| Constant-Aperture Diaphragm 2 | | ∞ | −0.07 | | |
| First Optical Lens 11 | Object-Side Surface 111 | 0.76 | 0.30 | 1.543600 | 56.070000 |
| | Image-Side Surface 112 | 5.12 | 0.25 | | |
| Second Optical Lens 12 | Object-Side Surface 121 | −0.79 | 0.38 | 1.543600 | 56.070000 |
| | Image-Side Surface 122 | −0.47 | 0.03 | | |
| Third Optical Lens 13 | Object-Side Surface 131 | 1.06 | 0.25 | 1.543600 | 56.070000 |
| | Image-Side Surface 132 | 0.51 | 0.13 | | |
| Filter 3 | Object-Side Surface 31 | ∞ | 0.21 | 1.516800 | 64.167336 |
| | Image-Side Surface 32 | ∞ | 0.34 | | |

Table 2 shows, as below, parameters of the aspheric surfaces 111, 112, 121, 122, 131, 132 of the first preferred embodiment according to the present invention.

TABLE 2

| | First Optical Lens 11 | | Second Optical Lens 12 | | Third Optical Lens 13 | |
|---|---|---|---|---|---|---|
| | Object-Side Surface 111 | Image-Side Surface 112 | Object-Side Surface 121 | Image-Side Surface 122 | Object-Side Surface 131 | Image-Side Surface 132 |
| k | −1.5 | −115.66 | 1.77 | −3.04 | −15.78 | −4.12 |
| A | 0.298996 | 0.810583 | −0.9041413 | −1.55944 | −1.61617 | −1.67701 |
| B | 0.913824 | −47.5846 | 67.707357 | −26.8597 | 4.006272 | 4.906576 |
| C | −11.8886 | 1131.087 | −27.972934 | 746.6849 | −12.8901 | −8.65057 |

TABLE 2-continued

| | First Optical Lens 11 | | Second Optical Lens 12 | | Third Optical Lens 13 | |
|---|---|---|---|---|---|---|
| | Object-Side Surface 111 | Image-Side Surface 112 | Object-Side Surface 121 | Image-Side Surface 122 | Object-Side Surface 131 | Image-Side Surface 132 |
| D | 71.62558 | −15267.3 | 60285.959 | −9870.25 | 85.67837 | −3.62416 |
| E | −747.489 | 115098.8 | −781550.6 | 78677.45 | −351.364 | 58.32044 |
| F | 9.062 | −458517 | −6371663.61 | −387051 | 795.056 | −135.961 |
| G | −5975.47 | 749412.7 | −31648866.9 | 1163176 | −1011.75 | 152.3591 |
| H | 0 | 0 | 87031681.9 | −1956484 | 683.4195 | 0 |
| J | 0 | 0 | −101297951 | 1404392 | −191.476 | 0 |

Second Preferred Embodiment

Figure 5:
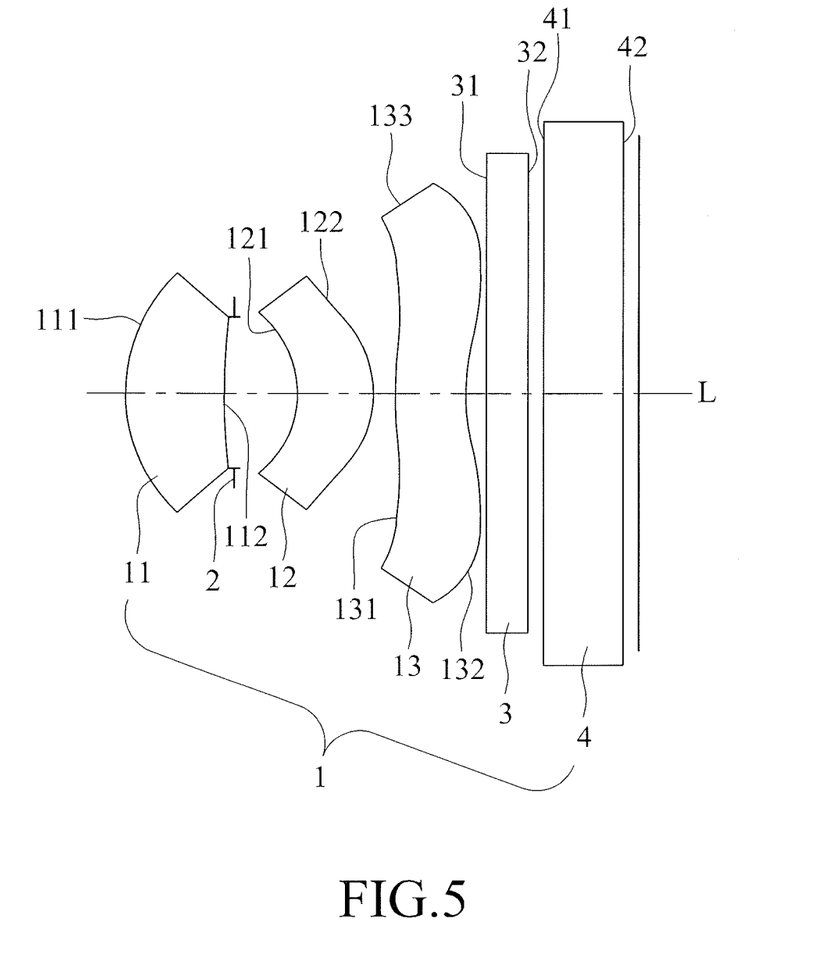
FIG. 5 is a schematic view of a second preferred embodiment of the imaging lens assembly according to the present invention.
Figure 6:
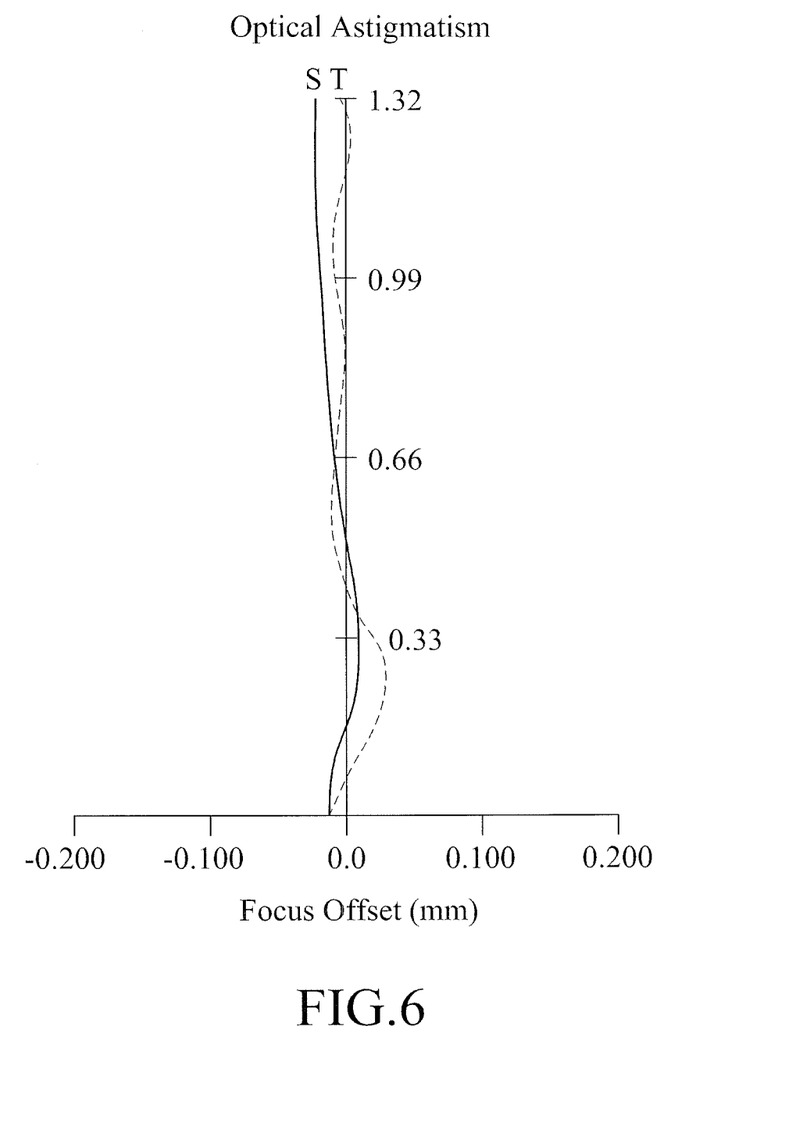
FIG. 6 is a simulation result of optical astigmatism of the second preferred embodiment.
Figure 7:
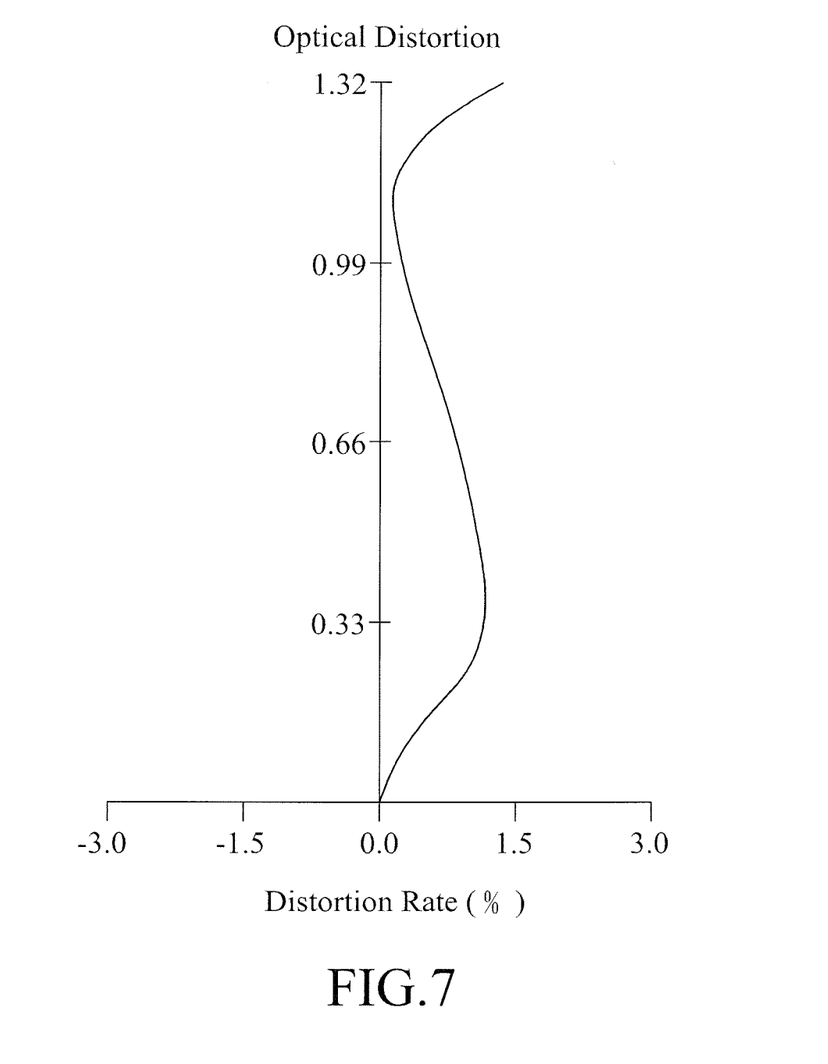
FIG. 7 is a simulation result of optical distortion of the second preferred embodiment.
Figure 8:
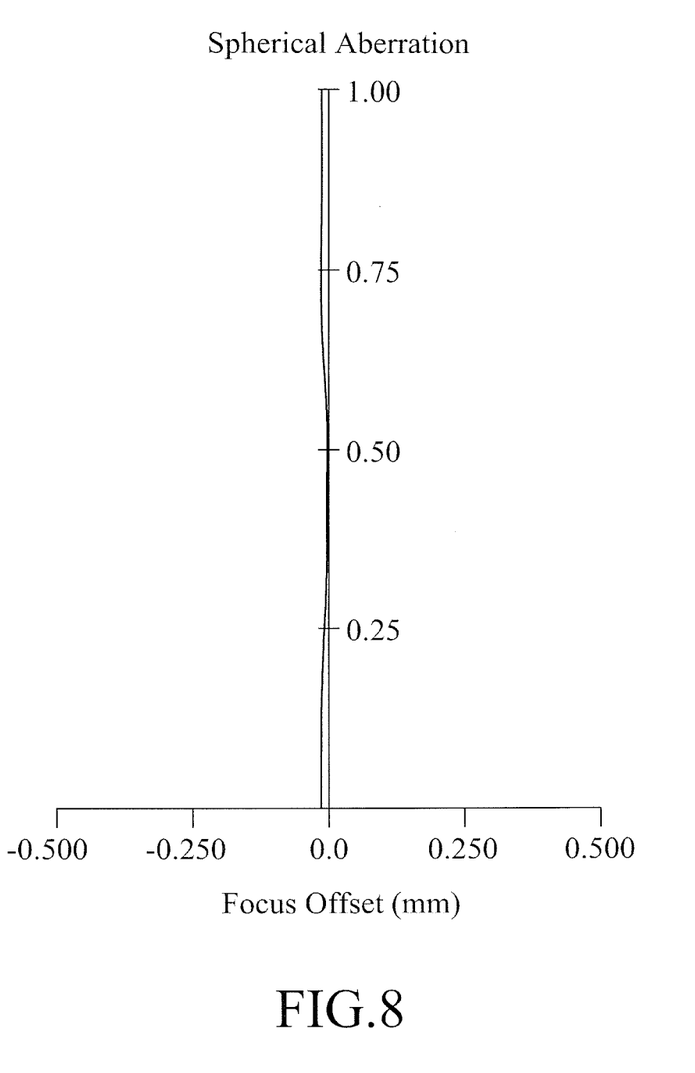
FIG. 8 is a simulation result of spherical aberration of the second preferred embodiment.

FIG. 5 is a schematic view of a second preferred embodiment of the imaging lens assembly according to the present invention. FIG. 6 shows simulation result of optical astigmatism of the second preferred embodiment. FIG. 7 shows simulation result of optical distortion of the second preferred embodiment. FIG. 8 shows simulation result of spherical aberration of the second preferred embodiment.

The second preferred embodiment of the imaging lens assembly according to the present invention further includes a cover glasses 4 that is for protection of the image sensor on the imaging plane.

Herein, the constant-aperture diaphragm 2 is disposed between the first optical lens 11 and the second optical lens 12. Each of the object-side surface 111, 121, 131 and the image-side surface 112, 122, 132 of the first, second and third optical lenses 11, 12, 13 is aspheric. Specifically, the highest order aspheric coefficient for the second preferred embodiment is 16.

In this preferred embodiment, V1=56.07, V2=56.07, f=1.89 mm, and Dg=2.64 mm. As a result, |V1−V2|=0 and f/Dg=0.71.

Table 3 shows, as below, optical parameters of the filter 3, lenses 11, 12, 13, the constant-aperture diaphragm 2, and the cover glasses 4 having an object-side surface 41 that faces the object side and an image-side surface 42 that faces the image side of the second preferred embodiment according to the present invention.

TABLE 3

| | | Radius of Curvature | Thickness | Refractive Index (Nd) | Abbe Number (Vd) |
|---|---|---|---|---|---|
| First Optical Lens 11 | Object-Side Surface 111 | 0.84 | 0.50 | 1.534600 | 56.070000 |
| | Image-Side Surface 112 | 2.98 | 0.05 | | |
| Constant-Aperture Diaphragm 2 | | ∞ | 0.32 | | |
| Second Optical Lens 12 | Object-Side Surface 121 | −0.65 | 0.39 | 1.534600 | 56.070000 |
| | Image-Side Surface 122 | −0.56 | 0.11 | | |
| Third Optical Lens 13 | Object-Side Surface 131 | 1.53 | 0.36 | 1.534600 | 56.070000 |
| | Image-Side Surface 132 | 0.85 | 0.1 | | |
| Filter 3 | Object-Side Surface 31 | ∞ | 0.21 | 1.516800 | 64.167336 |
| | Image-Side Surface 32 | ∞ | 0.07 | | |
| Cover glasses 4 | Object-Side Surface 41 | ∞ | 0.40 | 1.516800 | 64.167336 |
| | Image-Side Surface 42 | ∞ | 0.15 | | |

Table 4 shows, as below, parameters of the aspheric surfaces 111, 112, 121, 122, 131, 132 of the second preferred embodiment according to the present invention.

TABLE 4

| | First Optical Lens 11 | | Second Optical Lens 12 | | Third Optical Lens 13 | |
|---|---|---|---|---|---|---|
| | Object-Side Surface 111 | Image-Side Surface 112 | Object-Side Surface 121 | Image-Side Surface 122 | Object-Side Surface 131 | Image-Side Surface 132 |
| k | 0.44 | 45.56 | 0.44 | −0.26 | −99.4 | −10.76 |
| A | 0.001816 | −0.20427 | −0.39781 | −0.5867 | −0.5342 | −0.46717 |

TABLE 4-continued

| | First Optical Lens 11 | | Second Optical Lens 12 | | Third Optical Lens 13 | |
|---|---|---|---|---|---|---|
| | Object-Side Surface 111 | Image-Side Surface 112 | Object-Side Surface 121 | Image-Side Surface 122 | Object-Side Surface 131 | Image-Side Surface 132 |
| B | −0.6689 | −1.68182 | −4.09517 | 5.759466 | 0.840689 | 0.410392 |
| C | 2.812027 | 22.27277 | −4.79865 | −18.4273 | −0.22188 | −0.30076 |
| D | −7.14215 | −318.658 | 178.3957 | 24.39595 | −0.6585 | 0.018649 |
| E | −41.0004 | 1695.994 | −176.021 | 61.66405 | 0.017753 | 0.104722 |
| F | 79.92942 | −3353.03 | −923.303 | −24.1267 | 0.71809 | −0.051 |
| G | −133.358 | −4632.1 | −473.195 | −96.6002 | −0.3924 | −0.01234 |

Third Preferred Embodiment

Figure 9:
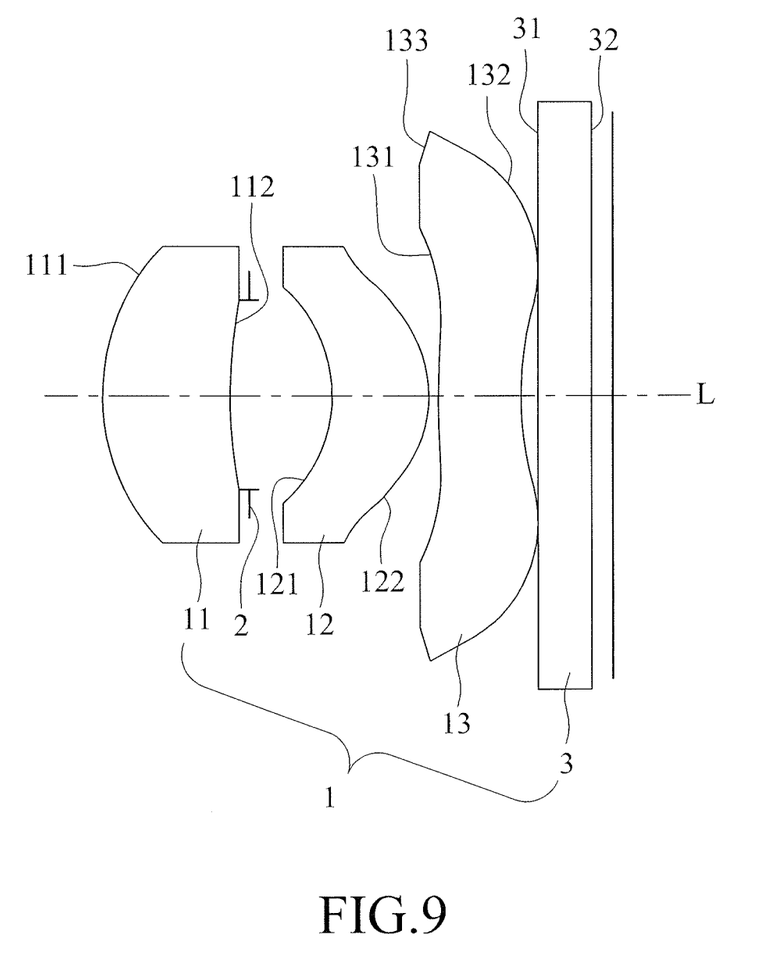
FIG. 9 is a schematic view of a third preferred embodiment of the imaging lens assembly according to the present invention.
Figure 10:
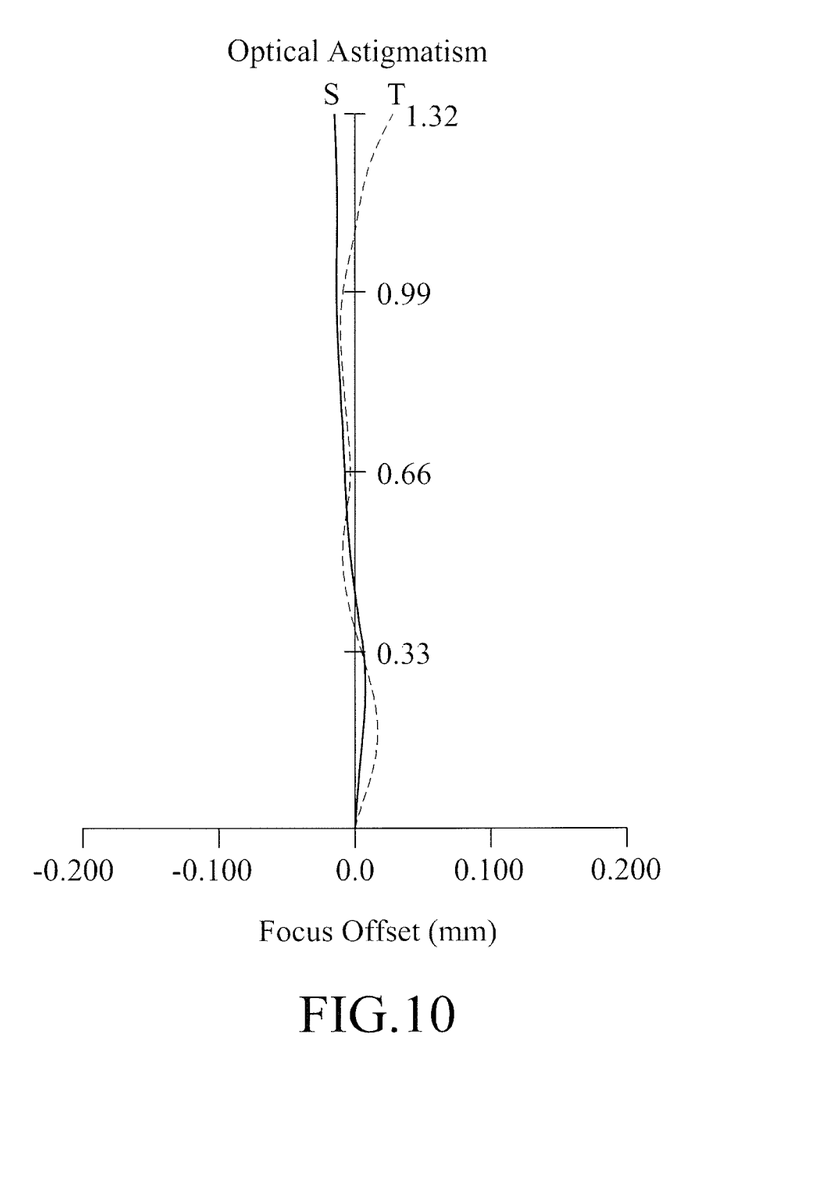
FIG. 10 is a simulation result of optical astigmatism of the third preferred embodiment.
Figure 11:
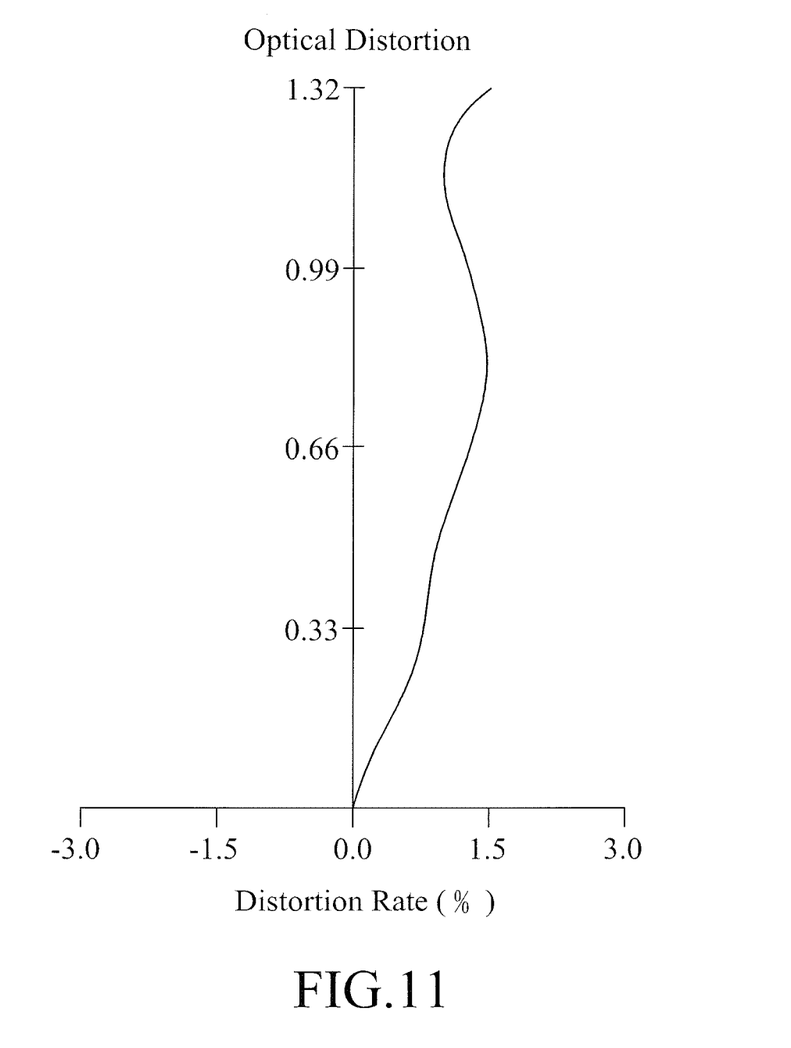
FIG. 11 is a simulation result of optical distortion of the third preferred embodiment.
Figure 12:
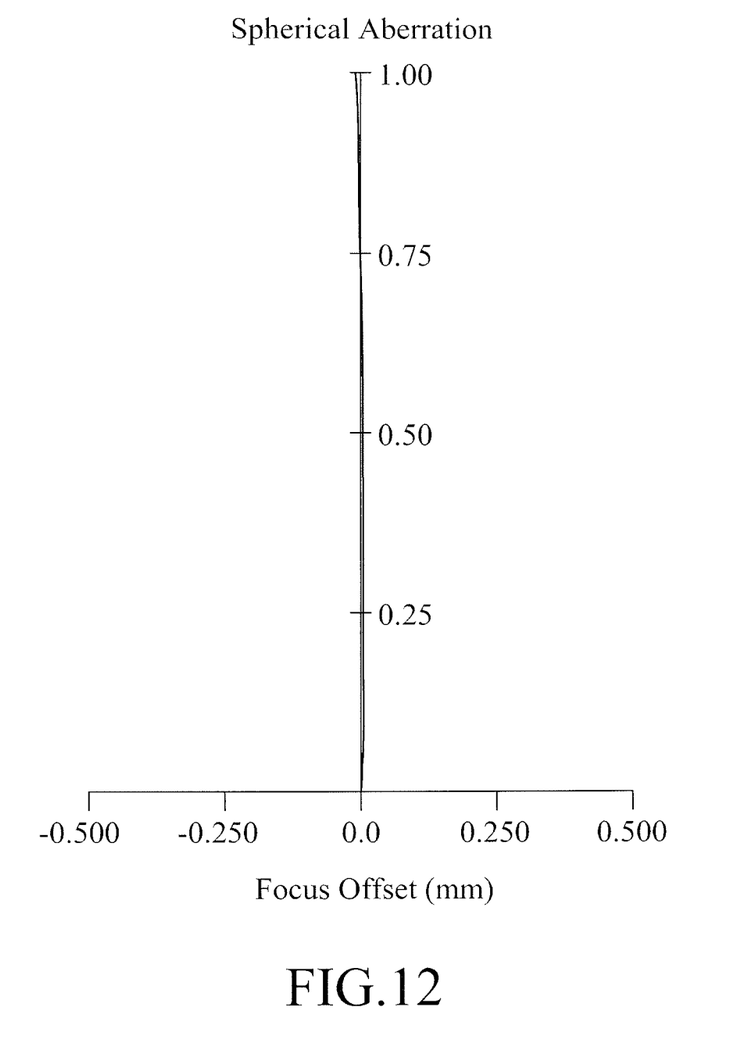
FIG. 12 is a simulation result of spherical aberration of the third preferred embodiment.

FIG. 9 is a schematic view of a third preferred embodiment of the imaging lens assembly according to the present invention. FIG. 10 shows simulation result of optical astigmatism of the third preferred embodiment. FIG. 11 shows simulation result of optical distortion of the third preferred embodiment. FIG. 12 shows simulation result of spherical aberration of the third preferred embodiment.

In the third preferred embodiment, the constant-aperture diaphragm 2 is disposed between the first optical lens 11 and the second optical lens 12. Each of the object-side surface 111, 121, 131 and the image-side surface 112, 122, 132 of the first, second and third optical lenses 11, 12, 13 is aspheric. Specifically, the highest order aspheric coefficient is 16.

In this preferred embodiment, V1=56.07, V2=56.07, f=1.82 mm, and Dg=2.30 mm. As a result, |V1−V2|=0 and f/Dg=0.79.

Table 5 shows, as below, optical parameters of the filter 3, lenses 11, 12, 13 and the constant-aperture diaphragm 2 of the third preferred embodiment according to the present invention.

TABLE 5

| | | Radius of Curvature | Thickness | Refractive Index (Nd) | Abbe Number (Vd) |
|---|---|---|---|---|---|
| First Optical Lens 11 | Object-Side Surface 111 | 0.80 | 0.50 | 1.534600 | 56.070000 |
| | Image-Side Surface 112 | 3.07 | 0.03 | | |
| Constant-Aperture Diaphragm 2 | | ∞ | 0.35 | | |
| Second Optical Lens 12 | Object-Side Surface 121 | −0.61 | 0.36 | 1.534600 | 56.070000 |
| | Image-Side Surface 122 | −0.46 | 0.04 | | |
| Third Optical Lens 13 | Object-Side Surface 131 | 2.12 | 0.31 | 1.534600 | 56.070000 |
| | Image-Side Surface 132 | 0.72 | 0.07 | | |
| Filter 3 | Object-Side Surface 31 | ∞ | 0.21 | 1.516800 | 64.167336 |
| | Image-Side Surface 32 | ∞ | 0.50 | | |

Table 6 shows, as below, parameters of the aspheric surfaces of the third preferred embodiment according to the present invention.

TABLE 6

| | First Optical Lens 11 | | Second Optical Lens 12 | | Third Optical Lens 13 | |
|---|---|---|---|---|---|---|
| | Object-Side Surface 111 | Image-Side Surface 112 | Object-Side Surface 121 | Image-Side Surface 122 | Object-Side Surface 131 | Image-Side Surface 132 |
| k | 0.18 | 62.67 | 0.51 | −0.51 | −299.94 | −11.53 |
| A | 0.050024 | −0.21679 | −0.2168 | −0.21972 | −0.97161 | −0.7564 |
| B | −1.40342 | −3.3046 | −3.88303 | 8.73758 | 1.365358 | 0.753884 |
| C | 7.605217 | 52.39022 | −34.0494 | −49.6214 | −0.52307 | −0.78219 |
| D | −10.1212 | −869.081 | 315.8338 | 80.23194 | −1.64 | 0.129789 |
| E | −62.0405 | 6275.19 | 1053.259 | 253.3124 | 0.381722 | 0.351894 |
| F | 217.0221 | −16571.3 | −4653.15 | −189.373 | 3.639227 | −0.50856 |
| G | −203.99 | −29272.2 | −2990.32 | −722.691 | −2.17449 | 0.239813 |

To conclude, advantageous features of the imaging lens assembly according to the present invention are as follows:

1. The imaging lens assembly of the present invention satisfies the optical condition of 0.55<f/Dg<0.85 (i.e., eq1), thereby allowing the possibility to achieve a smaller size under the same maximum viewing angle as the prior art.

2. The imaging lens assembly of the present invention satisfies the optical condition of |V1−V2|<10 (i.e., eq2), resulting in reduction of the cost of material purchase without degrading the optical performance of the imaging lens assembly.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. An imaging lens assembly comprising:
    an optical lens set including first, second and third optical lenses that are arranged sequentially from an object side to an image side along an optical axis of said imaging lens assembly,
        said first optical lens having a positive refractive power near the optical axis,
        said second optical lens having a positive refractive power near the optical axis,
        said third optical lens having a negative refractive power near the optical axis, and having an aspherical object-side surface that faces the object side, an aspherical image-side surface that faces the image side, and a peripheral surface interconnecting said object-side surface and said image-side surface, at least one of said object-side surface and said image-side surface of said third optical lens having at least one inflection point between the optical axis and said peripheral surface; and
    a constant-aperture diaphragm disposed between said second optical lens and the object side;
    wherein said imaging lens assembly satisfies the following optical condition:

$$0.55 < f/Dg < 0.85,$$

in which, f represents a focal length of said imaging lens assembly, and Dg represents a length of a diagonal line of a maximum viewing angle in an imaging plane.

2. The imaging lens assembly as claimed in claim 1, satisfying the following optical condition:

$$|V1-V2|<10,$$

in which, V1 represents an Abbe number of said first optical lens, and V2 represents an Abbe number of said second optical lens.

3. The imaging lens assembly as claimed in claim 1, wherein
    each of said first and second optical lenses has an object-side surface facing the object side and an image-side surface facing the image side, and
    at least one of said object-side surface and said image-side surface of at least one of said first and second optical lenses is aspheric.

4. The imaging lens assembly as claimed in claim 1, wherein each of said first and second optical lenses has an object-side surface facing the object side and an image-side surface facing the image side, and wherein:
    said object-side surface of said first optical lens is a convex surface, and said image-side surface of said first optical lens is a concave surface; and
    said object-side surface of said second optical lens is a concave surface, and said image-side surface of said second optical lens is a convex surface.

5. The imaging lens assembly as claimed in claim 1, wherein said constant-aperture diaphragm is disposed between said first optical lens and the object side.

6. The imaging lens assembly as claimed in claim 1, wherein said constant-aperture diaphragm is disposed between said first optical lens and said second optical lens.

* * * * *